US006673864B2

(12) United States Patent
Patel et al.

(10) Patent No.: US 6,673,864 B2
(45) Date of Patent: Jan. 6, 2004

(54) CONDUCTIVE POLYESTER/ POLYCARBONATE BLENDS, METHODS FOR PREPARATION THEREOF, AND ARTICLES DERIVED THEREFROM

(75) Inventors: Bimal R. Patel, Evansville, IN (US); Estelle Cheret, Stabroek (BE)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 09/729,985

(22) Filed: Dec. 5, 2000

(65) Prior Publication Data

US 2002/0099128 A1 Jul. 25, 2002

Related U.S. Application Data

(60) Provisional application No. 60/250,248, filed on Nov. 30, 2000.

(51) Int. Cl.[7] .................................................. C08K 3/40

(52) U.S. Cl. ......................... 524/494; 524/495; 524/496

(58) Field of Search ................................. 524/494, 495, 524/496

(56) References Cited

U.S. PATENT DOCUMENTS

| | | | | |
|---|---|---|---|---|
| 2,465,319 | A | | 3/1949 | Whinfield et al. |
| 3,018,272 | A | | 1/1962 | Griffing et al. |
| 3,047,539 | A | | 7/1962 | Pengilly et al. |
| 3,546,008 | A | | 12/1970 | Shields et al. |
| 3,635,895 | A | | 1/1972 | Kramer |
| 3,864,428 | A | | 2/1975 | Nakamura et al. |
| 3,953,404 | A | | 4/1976 | Borman |
| 4,001,184 | A | | 1/1977 | Scott |
| 4,264,487 | A | | 4/1981 | Fromuth et al. |
| 4,265,789 | A | | 5/1981 | Chrisopherson et al. |
| 4,401,804 | A | | 8/1983 | Wooten et al. |
| 4,476,274 | A | | 10/1984 | Liu |
| 4,532,290 | A | | 7/1985 | Jaquiss et al. |
| 4,559,164 | A | | 12/1985 | Kostelnik et al. |
| 4,559,388 | A | | 12/1985 | Liu et al. |
| 5,354,791 | A | | 10/1994 | Gallucci |
| 5,608,027 | A | | 3/1997 | Crosby et al. |
| 5,674,928 | A | | 10/1997 | Chisholm et al. |
| 5,840,798 | A | | 11/1998 | Vollenberg et al. |
| 5,853,865 | A | * | 12/1998 | McHugh et al. ......... 428/297.4 |
| 5,895,709 | A | | 4/1999 | Paul et al. |
| 5,922,816 | A | | 7/1999 | Hamilton |
| 6,031,036 | A | | 2/2000 | Rosenquist et al. |
| 6,043,310 | A | | 3/2000 | Liu et al. |
| 6,046,265 | A | | 4/2000 | Clark et al. |
| 6,060,538 | A | | 5/2000 | Gallucci |
| 6,066,694 | A | | 5/2000 | Chisholm et al. |
| 6,096,818 | A | | 8/2000 | Nakaura et al. |

FOREIGN PATENT DOCUMENTS

| | | |
|---|---|---|
| EP | 0428042 | 5/1991 |

OTHER PUBLICATIONS

Foreign Search Report Jul. 29, 2002.
XP 002206489 (abstract), Nov. 22, 1991.

* cited by examiner

*Primary Examiner*—Edward J. Cain
(74) *Attorney, Agent, or Firm*—Oppedahl & Larson LLP

(57) ABSTRACT

A conductive thermoplastic composition includes a polycarbonate, a polyester, a conductive filler, an impact modifier, a transesterification quench, and glass fibers. The composition exhibits high strength and stiffness and is especially suitable for molding rigid, electrostatically painted automobile parts.

23 Claims, 1 Drawing Sheet

CONDUCTIVE POLYESTER/POLYCARBONATE BLENDS, METHODS FOR PREPARATION THEREOF, AND ARTICLES DERIVED THEREFROM

CROSS-REFERENCE TO RELATED APPLICATIONS

This application claims the benefit of U.S. Provisional Application Ser. No. 60/250,248 filed Nov. 30, 2000.

BACKGROUND OF THE INVENTION

The invention relates to plastic compositions having electrical conductivity. In particular, the invention relates to conductive thermoplastic compositions suitable for use in electrostatically painted articles.

It is known to impart electrical conductivity to plastic through the addition of a conductive filler, such as carbon black or carbon fibers, and thereby mold polymer articles that are particularly adapted for electrostatic painting. Electrostatic painting is an effective and desirable method of reducing manufacturing costs by reducing paint waste and polluting emissions, but it requires that the article to be painted be electrically conductive. Because plastic parts are generally insulating, the plastic article must be painted with a conductive primer or must be made conductive.

Painting nonconductive polymer parts with a conductive primer results in overspray, waste, and emissions of the primer itself and defeats many of the advantages of electrostatic painting. Use of a conductive primer may be avoided by adding a conductive filler such as conductive carbon black to the plastic composition. However, polymers tend to lose strength when even small amounts of carbon black are added. The prior art solutions have been to provide compositions that make the resulting plastic more ductile and flexible. For example, U.S. Pat. No. 5,484,838 to Helms et al. generally describes conductive blends of a crystalline polymer and a semi-crystalline or amorphous polymer. While such prior art compositions are sufficient for such applications as soft fascia, they are not suitable where higher strength and stiffness is needed, such as functional body panels, particularly for heavy duty vehicles such as trucks. What is needed is a polymer composition that has sufficient conductivity for electrostatic painting, yet is strong and stiff enough for heavy duty uses such as truck fenders, body panels, and the like.

BRIEF SUMMARY OF THE PREFERRED EMBODIMENTS

A thermoplastic composition providing high strength and stiffness comprises: about 10 to about 50 weight percent polycarbonate; about 20 to about 60 weight percent polyester; about 0.005 to about 5 parts by weight transesterification quencher per 100 parts by weight polyester; about 1 to about 20 weight percent impact modifier; about 0.2 to about 20 weight percent conductive filler; and about 10 to about 40 weight percent glass fibers; wherein the composition after molding has a flexural modulus according to ASTM D790 not less than about $4\times10^5$ pounds per square inch (psi); and wherein all weight percents are based on the total weight of the composition.

DETAILED DESCRIPTION OF THE PREFERRED EMBODIMENTS

Figure 1:
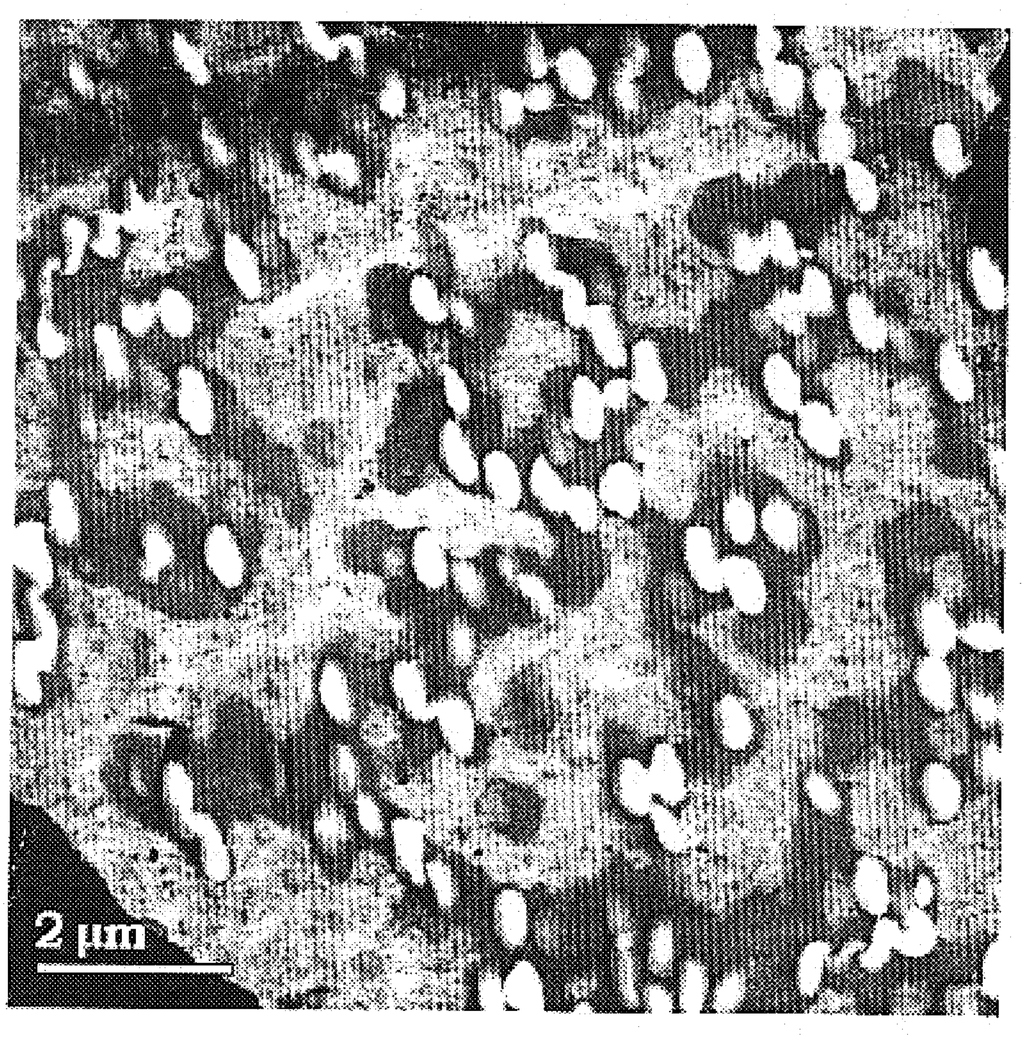
FIG. 1 is a transmission electron micrograph of the sample corresponding to Example 2. The micrograph shows two co-continuous phases. The dark gray areas correspond to a continuous amorphous polycarbonate phase; the white ovoids within the dark gray areas correspond to the core-shell impact modifier, which has a domain size diameter of about 0.4 micron; the lighter gray areas correspond to a continuous poly(ethylene terephthalate) phase; and the small black specks within the lighter gray areas correspond to particles of conductive carbon black.

The thermoplastic composition comprises: about 10 to about 50 weight percent polycarbonate; about 20 to about 60 weight percent polyester; about 0.005 to about 5 parts by weight transesterification quencher per 100 parts by weight polyester; about 1 to about 20 weight percent impact modifier; about 0.2 to about 20 weight percent conductive filler; and about 10 to about 40 weight percent glass fibers; wherein the composition after molding has a flexural modulus according to ASTM D790 not less than about $4\times10^5$ psi; and wherein all weight percents are based on the total weight of the composition.

Suitable polyesters include those derived from an aliphatic or cycloaliphatic diol, or mixtures thereof, containing from 2 to about 10 carbon atoms, and at least one aromatic dicarboxylic acid. Preferred polyesters are derived from an aliphatic diol and an aromatic dicarboxylic acid and have repeating units of the following general formula:

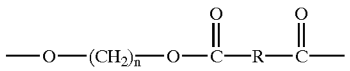

wherein n is an integer of from 2 to 6, and R is a $C_6$–$C_{20}$ aryl radical comprising a decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4'-bisbenzoic acid, and mixtures thereof. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid, naphthalene dicarboxylic acid, and mixtures comprising at least one of the foregoing dicarboxylic acids.

The aliphatic or cycloaliphatic diols include glycols, such as ethylene glycol, propylene glycol, butanediol, hydroquinone, resorcinol, trimethylene glycol, 2-methyl-1,3-propane glycol, hexamethylene glycol, decamethylene glycol, cyclohexane dimethanol, and neopentylene glycol.

Also contemplated herein are the above polyesters with minor amounts, e.g., from about 0.5 to about 30 percent by weight, of units derived from aliphatic acids and/or aliphatic polyols to form copolyesters. The aliphatic polyols include glycols, such as poly(ethylene glycol). Such copolyesters can be made following the teachings of, for example, U.S. Pat. Nos. 2,465,319 and 3,047,539.

Highly preferred polyesters include poly(ethylene terephthalate) ("PET"), poly(1,4-butylene terephthalate) ("PBT"), poly(propylene terephthalate) ("PPT"), and cycloaliphatic polyesters such as poly(1,4-cyclohexylenedimethylene-1,4-cyclohexanedicarboxylate) ("PCCD"). One preferred PBT resin is one obtained by polymerizing a glycol component at least 70 mole %, preferably at least 80 mole %, of which consists of tetramethylene glycol and an acid component at least 70 mole %, preferably at least 80 mole %, of which consists of terephthalic acid, or polyester-forming derivatives thereof. The preferred glycol component can contain not more than 30 mole %, preferably not more than 20 mole %, of another glycol, such as ethylene glycol, trimethylene glycol, 2-methyl-1,3-propane glycol, hexamethylene glycol, decamethylene glycol, cyclohexane dimethanol, or neopentylene glycol. The preferred acid component can contain not more than 30 mole %, preferably not more than 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethane dicarboxylic acid, p-hydroxybenzoic acid, sebacic acid, adipic acid, or polyester-forming derivatives thereof.

Block copolyester resin components are also useful, and they can be prepared by the transesterification of (a) straight or branched chain poly(1,4-butylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. For example, a poly(1,4-butylene terephthalate) may be mixed with a polyester of adipic acid with ethylene glycol, and the mixture heated at 235° C. to melt the ingredients, then heated further under a vacuum until the formation of the block copolyester is complete. As the second component, there can be substituted poly (neopentyl adipate), poly(1,6-hexylene azelate-coisophthalate), poly(1,6-hexylene adipate-co-isophthalate), or the like. An exemplary block copolyester of this type is available commercially from General Electric Company, Pittsfield, Mass., under the trade designation VALOX® 330.

Especially useful when high melt strength is important are branched high melt viscosity poly(1,4-butylene terephthalate) resins, which include a small amount of, for example, up to 5 mole percent based on the terephthalate units, of a branching component containing at least three ester forming groups. The branching component can be one that provides branching in the acid unit portion of the polyester, or in the glycol unit portion, or it can be hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane; or dihydroxy carboxylic acids and hydroxydicarboxylic acids and derivatives, such as dimethyl hydroxyterephthalate, and the like. The branched poly(1,4-butylene terephthalate) resins and their preparation are described in U.S. Pat. No. 3,953,404 to Borman. In addition to terephthalic acid units, small amounts, for example, from 0.5 to 15 percent by weight of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexylenedimethanol, etc., as well as minor amounts of trifunctional, or higher, branching components, e.g., pentaerythritol, trimethyl trimesate, and the like. In addition, the poly(1,4-butylene terephthalate) resin component can also include other high molecular weight resins, in minor amount, such as poly(ethylene terephthalate), block copolyesters of poly(1,4-butylene terephthalate) and aliphatic/aromatic polyesters, and the like. The molecular weight of the poly(1,4-butylene terephthalate) should be sufficiently high to provide an intrinsic viscosity of about 0.6 to 2.0 deciliters per gram, preferably 0.8 to 1.6 dL/g, measured, for example, as a solution in a 60:40 mixture of phenol and tetrachloroethane at 30° C.

A highly preferred polyester is poly(ethylene terephthalate).

The polyester will generally contribute from about 20 to about 60 weight percent, preferably about 25 to about 50 weight percent, more preferably about 30 to about 45 weight percent, of the total composition.

As used herein, the term "polycarbonate" includes compositions having structural units of the formula

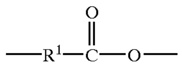

in which at least about 60 percent of the total number of $R^1$ groups are aromatic organic radicals and the balance thereof are aliphatic or alicyclic radicals. Preferably, $R^1$ is an aromatic organic radical and, more preferably, a radical of the formula $$—A^1—Y^1—A^2—$$

wherein each of $A^1$ and $A^2$ is a monocyclic divalent aryl radical and $Y^1$ is a bridging radical having one or two atoms separating $A^1$ from $A^2$. In an exemplary embodiment, one atom separates $A^1$ from $A^2$. Illustrative non-limiting examples of radicals of this type are —O—, —S—, —S(O)—, —$S(O)_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one atom separates $A^1$ and $A^2$. As used herein, the term "dihydroxy compound" includes, for example, bisphenol compounds having general formula

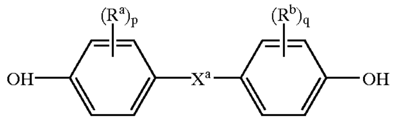

wherein $R^a$ and $R^b$ each independently represent a halogen atom or a monovalent hydrocarbon group having from 1 to about 12 carbon atoms; p and q are each independently integers from 0 to 4; and $X^a$ represents one of the groups of formula

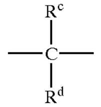

or

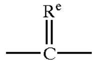

wherein $R^c$ and $R^d$ each independently represent a hydrogen atom or a monovalent linear or cyclic hydrocarbon group having from 1 to about 12 carbon atoms and $R^e$ is a divalent hydrocarbon group having from 1 to about 12 carbon atoms.

Some illustrative, non-limiting examples of suitable dihydroxy compounds include the dihydroxy-substituted aromatic hydrocarbons disclosed by name or formula (generic or specific) in U.S. Pat. No. 4,217,438. A nonexclusive list of specific examples of the types of bisphenol compounds includes the following:

1,1-bis(4-hydroxyphenyl)methane;

1,1-bis(4-hydroxyphenyl)ethane;

2,2-bis(4-hydroxyphenyl)propane (hereinafter "bisphenol A" or "BPA");

2,2-bis(4-hydroxyphenyl)butane;

2,2-bis(4-hydroxyphenyl)octane;

1,1-bis(4-hydroxyphenyl)propane;

1,1-bis(4-hydroxyphenyl)-n-butane;

bis(4-hydroxyphenyl)phenylmethane;

2,2-bis(4-hydroxy-1-methylphenyl)propane;

1,1-bis(4-hydroxy-t-butylphenyl)propane;

bis(hydroxyaryl) alkanes such as 2,2-bis(4-hydroxy-3-bromophenyl) propane;

1,1-bis(4-hydroxyphenyl)cyclopentane; and bis(hydroxyaryl)cycloalkanes such as 1,1-bis(4-hydroxyphenyl)cyclohexane.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl) isopropyl)benzene), tris-phenol PA (4(4(1,1-bis(p-hydroxyphenyl)-ethyl) alpha,alpha-dimethyl benzyl) phenol), 4-chloroformyl phthalic anhydride, trimesic acid and benzophenone tetracarboxylic acid. The branching agents may be added at a level of about 0.05 to about 2.0 weight percent. Branching agents and procedures for making branched polycarbonates are described in U.S. Pat. Nos. 3,635,895 and 4,001,184. All types of polycarbonate end groups are contemplated as being within the scope of the present invention.

Preferred polycarbonates are based on bisphenol A. The weight average molecular weight of the polycarbonate may be about 5,000 to about 100,000 atomic mass units (amu), preferably about 10,000 to about 65,000 amu, and more preferably about 15,000 to about 35,000 amu.

Preferred polycarbonate are copolymers of bisphenol A, such as those formed by reaction with phosgene and sold by General Electric Plastics under the trademark LEXAN®.

The polycarbonate will generally contribute from about 10 to about 50 weight percent of the composition, with about 15 to about 35 weight percent being preferred, and about 15 to about 30 weight percent being more preferred.

When blending polyesters with polycarbonates, transesterification may occur between them. This is undesirable because transesterification usually leads to poorer physical characteristics, poorer heat performance, and even poorer color in the final product. Transesterification between the polyesters and polycarbonates is prevented by blending the polycarbonate and polyester in the presence of a transesterification quencher.

There is no particular limitation on the structure of the quencher. Suitable transesterification quenchers include mono-, di-, and tri-hydrogen phosphites and their metal salts; mono-, di-, and tri-hydrogen phosphates and their metal salts; mono- and di-hydrogen phosphonates and their metal salts; pyrophosphates and their metal salts; silyl phosphates; mixtures comprising at least one of the foregoing quenchers; and the like. The suitability of a particular compound for use as a transesterification quencher and the determination of how much is to be used may be readily determined by preparing a mixture of the cycloaliphatic polyester and the aromatic polycarbonate with and without the particular transesterification quencher and determining the effect on melt viscosity, gas generation or color stability or the formation of interpolymer.

The mono-, di-, and tri-hydrogen phosphites and their metal salts have the formula $$P(OR^1)_a(OM^{n+1}{}_{1/n})_{3-a}$$

wherein each $R^1$ is independently $C_1$–$C_{12}$ alkyl, $C_1$–$C_{12}$ aryl, or $C_1$–$C_{18}$ alkylaryl; each M is independently hydrogen or a metal atom selected from Group IA, IIA, IB, or IIB of the periodic table; a is 0–2; and n is 1 or 2. Preferred compounds in this class include phosphorous acid, $H_3PO_3$.

The mono-, di-, and tri-hydrogen phosphates and their metal salts have the formula $$O{=}P(OR^1)_a(OM^{n+}{}_{1/n})_{3-a}$$

wherein $R^1$, M, a, and n are as defined for the phosphites above. Preferred compounds in this class include those in which a=0 and M is a metal atom selected from Group IB or IIB of the periodic table. A preferred compound is mono zinc phosphate (MZP; $ZnHPO_4$).

The mono- and di-hydrogen phosphonates and their metal salts have the formula $$P(R^1)(OR^1)_b(OM^{n+}{}_{1/n})_{2-b}$$

wherein $R^1$, M, and n are defined as above, and b=0 or 1.

The pyrophosphates and their metal salts have the formula $$M^z{}_xH_yP_qO_{3q+1}$$

wherein M is as defined for the phosphites above, x is 1–12, y is 1–12, q is 2–10, and z is 1–5, with the proviso that the sum (xz)+y is equal to q+2. M is preferably a Group IA or IIA metal. Preferred compounds in this class include $Na_3HP_2O_7$; $K_2H_2P_2O_7$; $KNaH_2P_2O_7$; and $Na_2H_2P_2O_7$. The particle size of the polyacid pyrophosphate should be less than 75 micrometers, preferably less than 50 micrometers and most preferably less than 20 micrometers.

The silyl phosphates may be of the formula

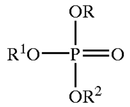

wherein R is hydrogen, a $C_1$–$C_{12}$ alkyl radical, a $C_1$–$C_{12}$ aryl radical, a $C_1$–$C_{18}$ alkylaryl radical, or a radical having the formula —$[(R^3)_2SiO]_a$—$Si(R^3)_3$, or —$[(R^3)_2SiO]_bH$; $R^1$ is hydrogen, a $C_1$–$C_{12}$ alkyl radical, a $C_1$–$C_{12}$ aryl radical, a $C_1$–$C_{18}$ alkylaryl radical, or a radical having the formula —$[(R^3)_2SiO]_c$—$Si(R^3)_3$, or —$[(R^3)_2SiO]_dH$; $R^2$ is —$[(R^3)_2SiO]_e$—$Si(R^3)_3$, or —$[(R^3)_2SiO]_fH$; a–f are independantly 0 to 20; the sum of a–f is 1 to 20; and $R^3$ is independently a $C_1$–$C_{12}$ monovalent hydrocarbon radical or a $C_1$–$C_{12}$ halogenated monovalent hydrocarbon radical. These compounds are described more fully in, for example, U.S. Pat. No. 5,922,816 to Hamilton.

These and other quenchers, including quencher mixtures, are described, for example, in U.S. Pat. No. 4,401,804 to Wooten et al., U.S. Pat. No. 4,532,290 to Jaquiss et al., U.S. Pat. No. 5,354,791 to Gallucci, U.S. Pat. No. 5,441,997 to Walsh et al., U.S. Pat. No. 5,608,027 to Crosby et al., and U.S. Pat. No. 5,922,816 to Hamilton.

Among the various quencher mixtures suitable for use are the mixtures of phosphorus acids and esters described in U.S. Pat. No. 5,608,027 to Crosby et al., and the combination of a mono- or dihydrogen phosphonate or mono-, di-, or trihydrogen phosphate compound and a di- or triester phosphonate compound or a phosphite compound described in U.S. Pat. No. 4,401,804 to Wooten et al.

The transesterification quencher is preferably present in the composition at about 0.005 to about 5 parts by weight, preferably about 0.1 to about 2 parts by weight, per 100 parts of the polyester component.

The conductive filler may be any filler that enhances the conductivity of the molded composition. Suitable conductive fillers may be fibrous, disc-shaped, spherical or amorphous and include, for example, conductive carbon black; conductive carbon fibers, including milled fibers; conductive vapor grown carbon fibers, and various mixtures thereof. Other conductive fillers which can be used are metal-coated carbon fibers; metal fibers; metal disks; metal particles; metal-coated disc-shaped fillers such as metal-coated talcs, micas and kaolins; and the like. Preferred conductive fillers include carbon black, carbon fibers, and mixtures thereof. Preferred carbon blacks include the conductive carbon blacks having average particle sizes less than about 200 nanometers, preferably less than about 100 nanometers, more preferably less than about 50 nanometers. Preferred conductive carbon blacks may also have surface areas greater than about 200 $m^2/g$, preferably greater than about 400 $m^2/g$, yet more preferably greater than about 1000 $m^2/g$. Preferred conductive carbon blacks may also have a pore volume (dibutyl phthalate absorption) greater than about 40 $cm^3/100$ g, preferably greater than about 100 $cm^3/100$ g, more preferably greater than about 150 $cm^3/100$ g. Preferred conductive carbon blacks may also have a volatiles content less than about 2 weight percent. Especially preferred carbon fibers include the graphitic or partially graphitic vapor grown carbon fibers having diameters of about 3.5 to about 500 nanometers, with diameters of about 3.5 to about 70 nanometers being preferred, and diameters of about 3.5 to about 50 nanometers being more preferred. Representative carbon fibers are the vapor grown carbon fibers described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

Generally, the conductive filler will contribute about 0.2 weight percent to about 20 weight percent to the total composition. The amount will depend on the nature of the conductive filler. For example, when the conductive filler is carbon black, the preferred amount will generally be about 2 to about 10 weight percent, more preferably about 3 to about 8 weight percent, yet more preferably about 4 to about 7 weight percent of the composition. When the conductive filler is a vapor grown carbon fiber, the preferred amount will generally be about 0.2 to about 6 weight percent, more preferably about 0.5 to about 4 weight percent, of the composition. Conductive filler amounts less than the above lower limits fail to provide adequate conductivity, while amounts greater than the above upper limits may tend to make the final blend brittle.

A preferred means of introducing the conductive filler into the composition is by preparing a conductive filler concentrate comprising (a) the conductive filler and (b) polycarbonate, polyester, or a blend thereof. Such concentrates may be prepared according to known methods or obtained commercially. When the conductive filler is carbon black, the conductive filler concentrate typically comprises about 5 to about 30 weight percent carbon black. By introducing the conductive filler in the form of such a concentrate, the carbon black is more rapidly, reliably, and consistently distributed through the blend.

In a preferred embodiment, at least about 50 percent, more preferably at least about 75 percent, of the conductive filler is disposed in the polyester phase of the polymer blend. In this case, the blend is conveniently prepared using a conductive filler concentrate comprising the conductive filler and the polyester.

Glass fiber is added to the composition to greatly increase the flexural modulus, albeit making the product more brittle. The resulting product has great strength and is highly suited to medium- and heavy-duty outdoor vehicle and device (OVAD) use and as a substitute for fiberglass parts such as fenders and body panels. Generally, the glass fibers will have a diameter of about 1 to about 50 micrometers, preferably about 1 to about 20 micrometers. Smaller diameter fibers are generally more expensive, and glass fibers having diameters of about 10 to about 20 micrometers presently offer a desirable balance of cost and performance. Preferred glass fibers have special coatings, called "sizings", that make the fibers compatible with whatever resin matrix is chosen. Suitable sizings for the glass fibers include a polyolefin wax with or without a functionalized silane, as described in U.S. Pat. No. 5,384,353 to Gemmell et al., and U.S. Pat. No. 6,060,538 to Gallucci. Other preferred sizing-coated glass fibers are commercially available from Owens Corning Fiberglass as, for example, OCF K filament glass fiber 183F.

The glass fibers may be blended first with the aromatic polycarbonate resin and polyester resin and then fed to an extruder and the extrudate cut into pellets, or, in a preferred embodiment, they may be separately fed to the feed hopper of an extruder. In a highly preferred embodiment, the glass fibers may be fed downstream in the extruder to minimize attrition of the glass. Generally, for preparing pellets of the composition set forth herein, the extruder is maintained at a temperature of approximately 480° F. to 550° F. The pellets so prepared when cutting the extrudate may be one-fourth inch long or less. As stated previously, such pellets contain finely divided uniformly dispersed glass fibers in the composition. The dispersed glass fibers are reduced in length as a result of the shearing action on the chopped glass strands in the extruder barrel. In addition, the amount of glass present in the composition may be about 10 to about 40 weight percent, preferably about 15 to about 35 weight percent, more preferably about 15 to about 30 weight percent, based on the total weight of the thermoplastic blend composition.

The composition comprises an impact modifier. So-called core-shell polymers built up from a rubber-like core on which one or more shells have been grafted are preferably used. The core usually consists substantially of an acrylate rubber or a butadiene rubber. One or more shells have been grafted on the core. Usually these shells are built up for the greater part from a vinylaromatic compound and/or a vinylcyanide and/or an alkyl(meth)acrylate and/or (meth)acrylic acid. The core and/or the shell(s) often comprise multifunctional compounds which may act as a cross-linking agent and/or as a grafting agent. These polymers are usually prepared in several stages. The preparation of core-shell polymers and their use as impact modifiers in combination with polycarbonate are described in U.S. Pat. Nos. 3,864,428 and 4,264,487. Especially preferred grafted polymers are the core-shell polymers available from Rohm & Haas under the tradename PARALOID®, including, for example, PARALOID® EXL3691 and PARALOID® EXL3330.

Olefin-containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPSYN 704 from Copolymer Rubber Company. They are more fully described in U.S. Pat. No. 4,559,388.

Various rubber polymers and copolymers can also be employed as impact modifiers. Examples of such rubbery polymers are polybutadiene, polyisoprene, and various other polymers or copolymers having a rubbery dienic monomer.

Styrene-containing polymers can also be used as impact modifiers. Examples of such polymers are acrylonitrile-butadiene-styrene, styrene-acrylonitrile, acrylonitrile-butadiene-alpha-methylstyrene, styrene-butadiene, styrene butadiene styrene, diethylene butadiene styrene, methacrylate-butadiene-styrene, high rubber graft acrylonitrile butadiene styrene, and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate copolymers, and the like. The preferred organopolysiloxane-polycarbonate block copolymers are the dimethylsiloxane-polycarbonate block copolymers.

Preferred impact modifiers include core-shell impact modifiers, such as those having a core of poly(butyl acrylate) and a shell of poly(methyl methacrylate); styrene-ethylene-butadiene copolymers; and methacrylate-butadiene-styrene copolymers.

A useful amount of impact modifier is about 1 to about 20 weight percent, preferably about 5 to about 15 weight percent, more preferably about 6 to about 12 weight percent, wherein the weight percentages are based on the entire weight of the composition. In a preferred embodiment, at least about 50 percent, more preferably at least about 75 percent, of the impact modifier is disposed within the polycarbonate phase of the polymer blend. The percentage of impact modifier occurring within the polycarbonate phase may be determined by transmission electron microscopy.

The composition may optionally comprise about 0.1 to about 20 weight percent, preferably about 0.2 to about 10 weight percent, more preferably about 0.5 to about 5 weight percent, of a polyester ionomer. The polyester ionomer is the polycondensation product of (1) an aromatic dicarboxylic acid or its ester-forming derivative; (2) a diol compound or its ester-forming derivative; and (3) an ester-forming compound containing an ionic sulfonate group.

The polyester ionomer may comprise a monovalent and/or divalent aryl carboxylic sulfonate salt units represented by the formula:

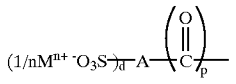

wherein p=1–3; d=1–3; p+d=2–6; M is a metal; n=1–5; and A is an aryl group containing one or more aromatic rings, for example, benzene, naphthalene, anthracene, biphenyl, terphenyl, oxy diphenyl, sulfonyl diphenyl, or alkyl diphenyl, where the sulfonate substituent is directly attached to an aryl ring. These groups are incorporated into the polyester through carboxylic ester linkages. The aryl groups may contain one or more sulfonate substituents (d=1–3) and may have one or more carboxylic acid linkages (p=1–3). Groups with one sulfonate substituent (d=1) and two carboxylic linkages (p=2) are preferred.

Preferred metals are alkali or alkaline earth metals where n=1–2. Zinc and tin are also preferred metals.

The polyester ionomer may alternatively comprise sulfonate salt units represented by the formula:

$$(1/nM^{n+}\ {}^{-}O_3S)_d\text{—}A\text{—}(OR''OH)_p$$

wherein p, d, M, n, and A are as defined above, and wherein R" is a divalent alkylene or alkyleneoxy group, for example, $-CH_2CH_2-$, $-CH_2CH_2OCH_2CH_2-$, $-CH(CH_3)CH_2-$, $-CH_2CH_2CH_2-$, $-CH_2CH_2CH_2CH_2-$, and the like.

A preferred polyester ionomer comprises divalent ionomer units represented by the formula:

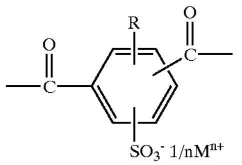

wherein R is hydrogen, halogen, alkyl having from one to about twenty carbons, or aryl having from one to about twenty carbons; M is a metal, and n=1–5.

Typical sulfonate substituents that can be incorporated into the metal sulfonate polyester copolymer may be derived from the following carboxylic acids or their ester forming derivatives: sodium 5-sulfoisophthalic acid, potassium sulfoterephthalic acid, sodium sulfonaphthalene dicarboxylic acid, calcium 5-sulfoisophthalate, potassium 4,4'-di (carbomethoxy) biphenyl sulfonate, lithium 3,5-di (carbomethoxy)benzene sulfonate, sodium p-carbomethoxybenzenesulfonate, dipotassium 5-carbomethoxy-1,3-disulfonate, sodio 4-sulfonaphthalene-2,7-dicarboxylic acid, 4-lithio sulfophenyl-3,5-dicarboxy benzene sulfonate, 6-sodiosulfo-2-naphthyl-3,5-dicarbomethoxy benzene sulfonate, and dimethyl 5-[4-(sodiosulfo)phenoxy]isophthalate.

Other suitable sulfonate carboxylic acids and their ester forming derivatives are described in U.S. Pat. Nos. 3,018,272 and 3,546,008 which are included herein by reference. Preferred sulfonate polyesters include those derived from sodium 3,5-dicarbomethoxybenzene sulfonate

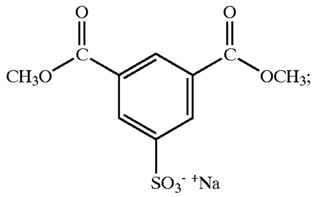

the bis(ethylene glycol) ester of sodium 5-sulfoisopthalate

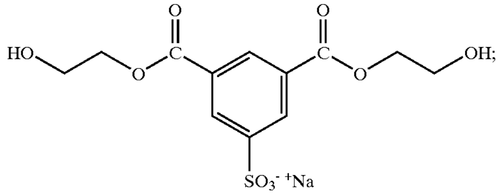

or the bis(diethylene glycol) ester of sodium 5-sulfoisopthalate

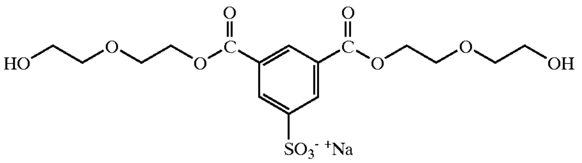

Typical diol reactants are aliphatic diols, including straight chain, branched, or cycloaliphatic alkane diols and may contain from 2 to 12 carbon atoms. Examples of such diols include ethylene glycol; propylene glycol, i.e., 1,2- and 1,3-propylene glycol; butane diol, i.e., 1,2-, 1,3- and 1,4-butane diol; diethylene glycol; 2,2-dimethyl-1,3-propane diol; 2-ethyl- and 2-methyl-1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. A preferred cycloaliphatic diol is 1,4-cyclohexane dimethanol or its chemical equivalent. When cycloaliphatic diols are used as the diol component, a mixture of cis- to trans-isomers may be used, it is preferred to have a trans isomer content of 70% or more. Chemical equivalents to the diols include esters, such as dialkyl esters, diaryl esters, and the like.

Examples of aromatic dicarboxylic acid reactants are isophthalic or terephthalic acid, 1,2-di(p-carboxyphenyl) ethane, 4,4'-dicarboxydiphenyl ether, 4,4'-bisbenzoic acid and mixtures thereof. All of these acids contain at least one aromatic nucleus. Acids containing fused rings can also be present, such as in 1,4-, 1,5-, or 2,6- naphthalene dicarboxylic acids. Preferred dicarboxylic acids include terephthalic acid, isophthalic acid or mixtures thereof.

A highly preferred polyester ionomer comprises repeating units of the formula:

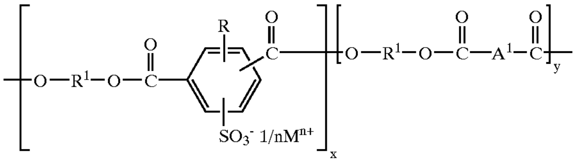

wherein R is hydrogen, halogen, alkyl having from one to about twenty carbons, or aryl having from one to about twenty carbons; M is a metal; n=1–5; $R^1$ is an alkylene radical having from one to about twelve carbon atoms; $A^1$ is a 1,2-phenylene, 1,3-phenylene, or 1,4-phenylene radical; and the mole fraction, x, of sulfonate-substituted units, is about 0.1 to about 50 percent of the sum of x and y, with about 0.2 to about 20 mole percent being preferred, about 0.5 to about 10 mole percent being more preferred, and about 1 to about 5 mole percent being even more preferred. Preferably R is hydrogen. Preferably $R^1$ is alkylene having from one to about six carbon atoms; more preferably $R^1$ is ethylene or butylene. M is preferably an alkali or alkaline earth metal; M is more preferably sodium or potassium.

Highly preferred ionomer polyesters include poly (ethylene terephthalate) (PET) ionomers, and poly(1,4-butylene terephthalate) (PBT) ionomers, and poly(1,3-propylene terephthalate) (PPT) ionomers.

Also contemplated herein are the above polyester ionomers with minor amounts, e.g., from about 0.5 to about 15 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) ionomer resin is one obtained by polymerizing an ionomer component comprising a glycol component comprising at least 70 mole percent, preferably at least 90 mole percent, of tetramethylene glycol; and an acid component comprising about 1 to about 10 mole percent of a dimethyl 5-sodium sulfo-1, 3-phenylenedicarboxylate, and at least 70 mole percent, preferably at least 90 mole percent, of terephthalic acid, and polyester-forming derivatives thereof.

The glycol component preferably comprises not more than 30 mole percent, more preferably not more than 20 mole percent, of another glycol, such as ethylene glycol, trimethylene glycol, 2-methyl-1,3-propane glycol, hexamethylene glycol, decamethylene glycol, cyclohexane dimethanol, or neopentylene glycol.

The acid component preferably comprises not more than 30 mole percent, preferably not more than 20 mole percent, of another acid such as isophthalic acid, 2,6-naphthalene dicarboxylic acid, 1,5-naphthalene dicarboxylic acid, 4,4'-diphenyldicarboxylic acid, 4,4'-diphenoxyethane dicarboxylic acid, p-hydroxy benzoic acid, sebacic acid, adipic acid and polyester-forming derivatives thereof.

It is also possible to use a branched polyester ionomer comprising a branching agent, for example, a glycol having three or more hydroxyl groups or an aromatic carboxylic acid having three or more carboxylic acid groups. Furthermore, it is sometimes desirable to have various concentrations of acid and hydroxyl end groups on the polyester, depending on the ultimate end-use of the composition.

In some instances, it is desirable to reduce the number of acid end groups, typically to less than about 30 micro equivalents per gram, with the use of acid reactive species.

In other instances, it is desirable that the polyester has a relatively high carboxylic end group concentration.

Preferred polyester ionomers will possess sufficient thermal stability to withstand compounding temperatures of at least about 250° C., preferably at least about 275° C., more preferably at least about 300° C.

Blends of polyesters ionomers with non sulfonate salt polyesters may also be employed as the polyester ionomer composition. For example, a blend of a sulfonate salt PBT and the unmodified PBT resin may be used. Preferred non sulfonate salt polyesters are the alkylene phthalate polyesters. It is preferred that the sulfonate salt polyester be present in an amount greater than or equal to the amount of the non sulfonate salt polyester.

In addition to the polyester, polycarbonate, transesterification quench, conductive filler, glass fiber, impact modifier, and polyester ionomer, there are a number of other optional additives that can be added to the blend to facilitate the manufacturing process and improve the final product. These include, but are not limited to, stabilizers, mold release agents, processing aids, nucleating agents, UV blockers, antioxidants, and the like. Such additives are well known in the art and appropriate amounts may be readily determined.

The preferred method of manufacturing the product is by combining the reagents into a single or twin-screw extruder equipped with a heater. The temperature will be high enough to melt the polyester and polycarbonate components, but not high enough to melt glass fiber or cause unwanted decomposition of any additive. The resulting molten polymer blend may then be extruded as rods, pellets, sheets, or whatever other shape is desired. In a preferred embodiment, the polymer blend is prepared by blending the polycarbonate, the polyester, the transesterification quencher, the impact modifier, and the conductive filler to form a first blend; and adding the glass fibers to the first blend to form the conductive thermoplastic composition.

In a preferred embodiment, the molded composition comprises a continuous phase comprising polycarbonate. In another preferred embodiment, the molded composition comprises a continuous phase comprising polyester. In a highly preferred embodiment, the composition comprises co-continuous phases of polycarbonate and polyester.

The invention is further illustrated by the following non-limiting examples.

EXAMPLES 1–7

Comparative Example 1

Referring to Table I below, eight formulations were created by combining the listed reagents into a twin-screw extruder at a temperature of about 265° C. to create a molten blend. The glass fiber was added downstream of the other reagents, though this is not required. Component amounts in Table I are expressed as weight percent of the total composition.

Table I also lists the total weight percent each of carbon black, polyester, and polycarbonate in the final mixture by taking into account the polyester and polycarbonate contributed by any conductive filler concentrate.

The reagents listed in Table I are described in detail as follows:

Poly(ethylene terephthalate) (PET) was obtained from DuPont under the trade name CRYSTAR® as CRYSTAR® Merge 3949, having an intrinsic viscosity of 0.53 dL/g measured in a 60:40 mixture of phenol and tetrachloroethane at 30° C.

The formulations include high and low viscosity bisphenol A polycarbonates as can be seen in Table I. The high viscosity LEXAN® is sold by General Electric under the product codes ML8101 and ML4505 and has an melt flow rate of about 6.2 to 8 g/10 minutes at 300° C. ML4505 is a powdered form and ML8101 a pelletized form. The powdered form was found to be useful as a carrier for the low concentration additives, such as the stabilizers. The low viscosity LEXAN® used is sold by General Electric as ML8199, having a melt flow rate of about 22 to 32 g/10 minutes measured at 300° C. It was found that the lower viscosity LEXAN® gave better product flow.

The transesterification quencher was a 45% aqueous solution of phosphorous acid, $H_3PO_3$.

"25% Carbon Black Colorant/PC Concentrate" refers to pellets consisting of 25% by weight carbon black and 75% by weight polycarbonate. The non-conductive, colorant-grade carbon black was obtained from Cabot as BLACK PEARLS® 800. The polycarbonate was the abovementioned ML4505. These were prepared by dispersing the carbon black into the polycarbonate using a twin-screw extruder.

"15% Conductive Carbon Black/PET Concentrate" refers to a pelletized conductive carbon black concentrate containing 15% by weight conductive carbon black dispersed into PET. The conductive carbon black was obtained from Cabot Corporation under the trade name BLACK PEARLS® as BLACK PEARLS® 2000. The PET was CRYSTAR® Merge 3949. These pellets were prepared by melting the carbon black into the PET in a twin-screw extruder. The concentrate was prepared from PET that had been dried for about 4 hours at 250° F. prior to concentrate preparation.

The glass fiber used was obtained from Owens Corning Fiberglass as OCF 183F K-filament, having a fiber diameter of 14 micrometers and coated with a sizing.

The impact modifier used was a core-shell acrylic in pelletized form. The impact modifier comprised a butyl acrylate (or derivatives thereof) core grafted to a poly (methyl methacrylate) shell. These pellets were obtained from Rohm and Haas under the trade name PARALOID® as PARALOID® 3330 pel.

The stabilizer was obtained from Ciba Geigy under the tradename IRGAFOS® as IRGAFOS® 168, which is a common phosphite stabilizer used for extruder processing.

The mold release used was pentaerythritol tetrastearate (PETS).

The antioxidant used was obtained from Ciba Geigy under the tradename IRGANOX® as IRGANOX® 1010. This antioxidant is a standard hindered phenol favored for both its processing and end-use stabilization.

The silica-based processing aid used was obtained from W. R. Grace under the trade name SYLOID® as SYLOID® 244X.

Samples were compounded at 260° C. Prior to molding, the conductive composition was dried at 250° F. for 4 hrs. During molding, the barrel temperature was set at 550° F., and the mold temperature was set at 185° F.

The physical properties of the polymer blend resulting from each formulation were tested and the results shown below in Table I. Melt volume ratio (MVR) was measured according to ASTM D1238. Tensile strength and elongation were measured according to ASTM D638. Flexural strength at yield and flexural modulus were measured according to ASTM D790. Notched Izod impact strength was measured according to ASTM D256. Multiaxial impact (Dynatup)

measurements were performed according to ASTM D3763. Heat distortion temperature (HDT) was measured according to ASTM D648 using a force of 264 pounds per square inch (psi). Percent ash was measured by weighing the sample before and after combustion in a microwave furnace at 850° C. for 10 minutes. Surface resistivity was measured using an ITW Ransburg Model No. 76634-00 according to procedures provided with the instrument. This instrument is common in the industry and has two posts (electrodes) separated by about 1 inch that are touched to the surface of an as-molded sample to provide a reading indicating the surface resistivity to the nearest factor of 10 megaohms (MOhms) and to determine whether the part is suitable for electrostatic painting. Surface resistivities of about 0 to about 1.0 gigaohms are considered paintable, while those greater than about 1.0 gigaohms are not. Preferred surface resistivities for electrostatic painting may be about 1 to about 200 megaohms.

Volume resistivity was measured as follows. The ends of a standard tensile bar were broken off in a brittle fashion. The resulting mid section of the test bar (length about 75 mm) had two fracture surfaces of about 10 millimeters by 4 millimeters. These fracture surfaces were painted with conductive silver paint. After the paint was dried, volume resistivity was measured with a normal multi-meter in the resistance mode. The applied voltage was in the range of 500 to 1000 V. Values of specific volume resistivity were obtained by multiplying the measured resistance by the fracture area, divided by the length. The specific volume resistivity values thus have units of Ohm-cm.

To assure electrostatic paintability of molded parts, preferred volume resistivities are less than about $10^4$ Ohm-cm, more preferably less than about $10^2$Ohm-cm.

TABLE I

| Compositions | | Comp. Ex. 1 | Ex. 1 | Ex. 2 | Ex. 3 | Ex. 4 | Ex. 5 | Ex. 6 | Ex. 7 |
|---|---|---|---|---|---|---|---|---|---|
| Glass Fiber | | 30.00 | 30.00 | 30.00 | 30.00 | 24.00 | 15.56 | 23.08 | 14.89 |
| PET Resin | | 36.20 | 6.20 | | | 14.00 | 15.56 | 13.46 | 14.89 |
| LEXAN ® PC Resin, high viscosity pellets | | 10.00 | | | | | | | |
| LEXAN ® PC Resin, low viscosity pellets | | 8.00 | 20.00 | 20.00 | 26.20 | 17.00 | 18.88 | 16.35 | 18.09 |
| LEXAN ® PC Resin, low viscosity powder | | 1.00 | 3.00 | 3.00 | 3.00 | 3.60 | 4.00 | 3.46 | 3.83 |
| Impact Modifier | | 10.00 | 10.00 | 16.20 | 10.00 | 6.00 | 6.66 | 9.61 | 10.64 |
| Antioxidant | | 0.20 | 0.20 | 0.20 | 0.20 | 0.15 | 0.17 | 0.14 | 0.16 |
| Heat Stabilizer | | 0.20 | 0.20 | 0.20 | 0.20 | 0.20 | 0.22 | 0.19 | 0.21 |
| Transesterification Quencher | | 0.05 | 0.05 | 0.05 | 0.05 | 0.05 | 0.06 | 0.05 | 0.05 |
| Mold Release | | 0.20 | 0.20 | 0.20 | 0.20 | | | | |
| Processing Aid | | 0.15 | 0.15 | 0.15 | 0.15 | | | | |
| 25% Carbon Black Colorant/ PC Concentrate | | 4.00 | | | | | | | |
| 15% Conductive Carbon Black/ PET Concentrate | | | 30.00 | 30.00 | 30.00 | 35.00 | 38.88 | 33.65 | 37.23 |
| total carbon black | | 1.00 | 4.50 | 4.50 | 4.50 | 5.25 | 5.83 | 5.05 | 5.58 |
| total polyester | | 36.20 | 31.70 | 25.50 | 25.50 | 43.75 | 48.60 | 42.06 | 46.53 |
| total polycarbonate | | 22.00 | 23.00 | 23.00 | 29.20 | 20.60 | 22.88 | 19.81 | 21.92 |
| Properties | | | | | | | | | |
| MVR, 265° C., 5 kg, 0.0825" | cc/10 min | 26.6 | 7.5 | 3.1 | 6.6 | 18.3 | 23.5 | 15.5 | 20.9 |
| Tensile Strength, break, Type I | psi | $14.4 \times 10^3$ | $12.4 \times 10^3$ | $13.5 \times 10^3$ | $14.4 \times 10^3$ | $13.9 \times 10^3$ | $10.9 \times 10^3$ | $13.3 \times 10^3$ | $10.8 \times 10^3$ |
| Tensile Elongation, break, Type I | % | 4.5 | 3.3 | 3.9 | 3.6 | 4.3 | 3.0 | 3.6 | 3.2 |
| Flexural Strength, yield | psi | $22.9 \times 10^3$ | $17.1 \times 10^3$ | $19.6 \times 10^3$ | $19.3 \times 10^3$ | $20.4 \times 10^3$ | $15.0 \times 10^3$ | $20.4 \times 10^3$ | $16.5 \times 10^3$ |
| Flexural Modulus | psi | $9.0 \times 10^5$ | $11.1 \times 10^5$ | $10.2 \times 10^5$ | $10.0 \times 10^5$ | $10.5 \times 10^5$ | $7.4 \times 10^5$ | $9.7 \times 10^5$ | $7.1 \times 10^5$ |
| Izod Impact, notched, 23° C. | ft-lb/in | 2.00 | 1.67 | 2.02 | 1.75 | 1.16 | 0.80 | 1.18 | 0.82 |
| Dynatup, peak, 23° C., 4" × 0.125" disks | ft-lbs | 5.7 | 4.6 | 7.1 | 5.4 | 3.3 | 1.3 | 2.0 | 1.0 |
| Dynatup, total energy, 23° C., 4" × 0.125" disks | ft-lbs | 15.6 | 5.1 | 8.4 | 6.4 | 4.1 | 3.6 | 5.2 | 2.2 |
| HDT @ 264 psi | ° C. | 114 | 134 | 134 | 135 | 137 | 133 | 132 | 131 |
| Surface Resistivity using ITW Ransburg Meter | MOhms | >1000 | 2–5 | 2–5 | 1–5 | 50–100 | 5–50 | 50–150 | 2–20 |
| Volume Resistivity | Ohm-cm | $9.8 \times 10^7$ | 83 | 136 | 98 | 82 | 68 | 91 | 69 |

As can be seen, Examples 2–7 exhibit higher heat distortion temperatures, lower surface resistivities, and lower volume resistivities compared to Comparative Example 1. Examples 2–7 also maintain excellent tensile and flexural strength while providing very high stiffness compared to conductive plastics of the prior art.

The sample corresponding to Example 2 was analyzed by transmission electron microscopy (TEM) using a Phillips CM12 TEM instrument. The samples were stained with ruthenium tetraoxide and cryogenically frozen at −100° C. A representative electron micrograph is presented as FIG. 1 and shows two co-continuous phases. The dark gray areas correspond to a continuous amorphous polycarbonate phase; the white ovoids within the dark gray areas correspond to the core-shell impact modifier, which has a domain size diameter of about 0.4 micron; the lighter gray areas correspond to a continuous poly(ethylene terephthalate) phase; and the small black specks within the lighter gray areas correspond to particles of conductive carbon black.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

All cited patents and other references are incorporated herein by reference.

What is claimed is:

1. A conductive thermoplastic composition, comprising, based on the total weight of the composition:

10 to 50 weight percent polycarbonate, 20 to 60 weight percent polyester;

0.005 to 5 parts by weight transesterification quencher per 100 parts by weight of polyester;

1 to 20 weight percent impact modifier;

0.2 to 20 weight percent conductive filler; and 10 to 40 weight percent glass fibers;

wherein the composition comprises a first continuous phase comprising polyester, and wherein at least 50% of the conductive filler is disposed in the continuous phase comprising polyester.

2. The composition of claim 1, wherein the polycarbonate is synthesized from at least one dihydric phenol selected from the group consisting of 1,1-bis(4-hydroxyphenyl) methane; 1,1-bis(4-hydroxyphenyl)ethane; 2,2-bis(4-hydroxyphenyl)propane; 2,2-bis(4-hydroxyphenyl)butane; 2,2-bis(4-hydroxyphenyl)octane; 1,1-bis(4-hydroxyphenyl) propane; 1,1-bis(4-hydroxyphenyl)-n-butane; bis(4-hydroxyphenyl)phenylmethane; 2,2-bis(4-hydroxy-1-methylphenyl)propane; 1,1-bis(4-hydroxy-t-butylphenyl) propane; 2,2-bis(4-hydroxy-3-bromophenyl) propane; 1,1-bis(4-hydroxyphenyl)cyclopentane; and 1,1-bis(4-hydroxyphenyl)cyclohexane.

3. The composition of claim 1, wherein the polyester comprises repeating units of the formula

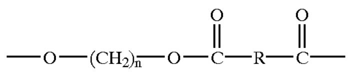

wherein n is 2 to 6, and R is a $C_6$–$C_{20}$ aryl radical.

4. The composition of claim 1, wherein the polyester comprises poly(ethylene terephthalate).

5. The composition of claim 1, wherein the conductive filler comprises conductive carbon black, vapor grown carbon fibers, or a mixture thereof.

6. The composition of claim 1, wherein the conductive filler comprises vapor grown carbon fibers having an average diameter of about 3.5 to about 70 nanometers.

7. The composition of claim 1, wherein the glass fibers have an average diameter of about 1 to about 50 micrometers.

8. The composition of claim 1, wherein the transesterification quencher is selected from the group consisting of mono-, di-, and tri-hydrogen phosphites and their metal salts; mono-, di-, and tri-hydrogen phosphates and their metal salts; mono- and di-hydrogen phosphonates and their metal salts; pyrophosphates and their metal salts; silyl phosphates; and mixtures comprising at least one of the foregoing quenchers.

9. The composition of claim 8, wherein the transesterification quencher comprises phosphorous acid.

10. The composition of claim 1, wherein the impact modifier is selected from the group consisting of core-shell polymers, olefin acrylates, olefin diene terpolymers, rubber polymers and copolymers, styrene-containing polymers, organic silicone rubbers, elastomeric fluorohydrocarbons, elastomeric polyesters, and random block polysiloxane-polycarbonate copolymers.

11. The composition of claim 1, wherein the impact modifier is selected from the group consisting of core-shell copolymers comprising a core of poly(butyl acrylate) and a shell of poly(methyl methacrylate); styrene-ethylene-butadiene copolymers; and methacrylate-butadiene-styrene copolymers.

12. The composition of claim 1, further comprising about 0.1 to about 20 weight percent of a polyester ionomer which is the polycondensation product of (1) an aromatic dicarboxylic acid or its ester-forming derivative; (2) a diol compound or its ester-forming derivative; and (3) an ester-forming compound containing an ionic sulfonate group.

13. The composition of claim 12, wherein the polyester ionomer comprises about 0.1 to about 50 mole percent of units derived from the ester-forming compound containing an ionic sulfonate group, based on the sum of units derived from the ester-forming compound containing an ionic sulfonate group and units derived from the aromatic dicarboxylic acid or its ester-forming derivative.

14. The composition of claim 1, further comprising at least one additive selected from the group consisting of stabilizers, mold release agents, processing aids, nucleating agents, UV blockers, and antioxidants.

15. The composition of claim 1, wherein the composition after molding has a heat distortion temperature at 264 psi according to ASTM D648 of at least 100° C.

16. The composition of claim 1, comprising a continuous phase comprising polycarbonate.

17. The composition of claim 16, wherein at least 50% of the impact modifier is disposed in the continuous phase comprising polycarbonate.

18. The composition of claim 1, wherein the composition comprises a second continuous phase comprising polycarbonate.

19. The composition of claim 1, wherein the composition after molding has a surface resistivity less than about 1000 megaohms.

20. A conductive thermoplastic composition, comprising, based on the total weight of the composition:

15 to 30 weight percent polycarbonate, 35 to 45 weight percent polyester;

0.01 to 0.04 parts by weight transesterification quencher per 100 parts by weight of polyester;

6 to 10 weight percent impact modifier;

4 to 6 weight percent conductive carbon black; and 15 to 30 weight percent glass fibers;

wherein the composition comprises a first continuous phase comprising polyester, and wherein at least 50% of the conductive filler is disposed in the continuous phase comprising polyester.

21. A method of preparing a conductive thermoplastic composition, comprising:

blending 10 to 50 weight percent polycarbonate; 20 to 60 weight percent polyester; 0.005 to 5 parts by weight transesterification quencher per 100 parts by weight of polyester; 1 to 20 weight percent impact modifier; and 0.2 to 20 weight percent conductive filler to form a first blend; and adding 10 to 40 weight percent glass fibers to the first blend total form the conductive thermoplastic composition;

wherein all weight percentages are based on the weight of the total composition, and wherein the conductive filler is provided to the first blend as a conductive filler concentrate comprising 5 to 30 parts by weight of conductive filler and 70 to 95 parts by weight of polyester.

22. A molded article comprising the composition of claim 1.

23. An automobile body panel comprising the composition of claim 1.

* * * * *